United States Patent [19]

Sinka et al.

[11] 4,164,426
[45] Aug. 14, 1979

[54] CONCRETE HAVING IMPROVED COMPRESSIVE STRENGTH

[75] Inventors: Joseph V. Sinka, Mendham; Jose L. Villa, Hightstown, both of N.J.

[73] Assignee: Diamond Shamrock Corporation, Cleveland, Ohio

[21] Appl. No.: 925,031

[22] Filed: Jul. 17, 1978

Related U.S. Application Data

[63] Continuation-in-part of Ser. No. 909,305, May 24, 1978, abandoned.

[51] Int. Cl.$^2$ ................................................. C04B 7/35
[52] U.S. Cl. ................................................. 106/90
[58] Field of Search ............................... 106/90, 314

[56] References Cited

U.S. PATENT DOCUMENTS

| | | | |
|---|---|---|---|
| 2,141,569 | 12/1938 | Tucker | 106/90 |
| 3,053,674 | 9/1962 | Liberthson | 106/90 |
| 3,317,327 | 5/1967 | Matsuda | 106/90 |
| 3,429,724 | 2/1969 | Keenum | 106/90 |
| 3,537,869 | 11/1970 | Proell | 106/90 |
| 3,954,491 | 5/1976 | Adrian | 106/90 |
| 4,026,723 | 5/1977 | Grof | 106/90 |
| 4,047,567 | 9/1977 | Childs | 106/90 |

*Primary Examiner*—Brian Hearn
*Attorney, Agent, or Firm*—Neal T. Levin; Leslie G. Nunn, Jr.

[57] ABSTRACT

Addition of zinc naphthaleneformaldehyde sulfonate to concrete mix improves compressive strength. This sulfonate is effective in concrete mixes prepared with Type I, II and III cements.

20 Claims, No Drawings

CONCRETE HAVING IMPROVED COMPRESSIVE STRENGTH

RELATED U.S. APPLICATION DATA

Continuation-in-part of Ser. No. 909,305, May 24, 1978, abandoned.

BACKGROUND OF THE INVENTION

1. Field of the Invention

This invention relates to concrete having improved compressive strength.

2. Description of the Prior Art

Concrete is a hard, strong building material made by mixing cement, sand, gravel and water. Water in the mixture causes the cement to set and bind the entire mixture in a hard mass. It is well known in concrete technology that the strength—usually the compressive strength as measured by the ASTM test C39-72—is a reliable criterion of general quality. For this reason, the whole technology of concrete is developed around obtaining a significant and practical strength with a minimum of cost, and a maximum of convenience in use. Despite extensive research, most of the concrete presently being used are simple mixtures of sand and coarse stone containing a minor proportion of portland cement with sufficient water being added to produce a mixture fluid enough to place in forms.

It is well known in the art that, the less water used in concrete, the higher the strength; considerable research has been directed to discovering mixtures of different particle sizes of sand and stone which will give fluid concrete having minimum water content. Various organic and inorganic additives have been found, which permit reduction in the water content of concrete. One such additive, Lomar ® D, the sodium salt of naphthalene sulfonate formaldehyde condensate is used commercially for this purpose.

U.S. Pat. No. 3,537,869—Proell, issued Nov. 3, 1970 describes use of additives containing sulfonated condensation products of formaldehyde and naphthalene or salts thereof in concrete mixes to increase compressive strength of the hardened concrete.

U.S. Pat. No. 3,429,724—Keenum, Jr. et al, issued Feb. 25, 1969 describes use of zinc salts such as zinc chloride, zinc sulfate, zinc nitrate and zinc acetate to retard hardening of concrete mixes.

SUMMARY OF THE INVENTION

An effective amount of zinc naphthaleneformaldehyde sulfonate is added to concrete mix to improve compressive strength. The zinc naphthaleneformaldehyde sulfonate may be added at any point during the preparation of the concrete mix. Depending when the sulfonate is introduced, it may be added in liquid or solid form. From about 0.05 to about 3% of zinc naphthaleneformaldehyde sulfonate based on the weight may be used in concrete mixes prepared with Type I, II and III cements.

DESCRIPTION OF THE PREFERRED EMBODIMENTS

To develop a more efficient water reducing agent based on naphthalene sulfonate formaldehyde (NSF) condensates, the effect of the zinc cation versus the sodium cation on compressive strength was investigated. It was found that the zinc naphthaleneformaldehyde sulfonate enhances compressive strength of concrete significantly beyond that obtained using sodium naphthaleneformaldehyde sulfonate at the same level of water reduction. This effect was due to the zinc cation as this was the only variable in these concrete mixes. Table II below shows the substantial improvement in compressive strengths at 3, 7 and 28 days in Type I, II and III cement. Improvements in compressive strength were in the range of from about 133% to about 185% depending on the type of cement.

Zinc naphthaleneformaldehyde sulfonate is also known as the zinc salt of naphthalene sulfonate formaldehyde condensates, formalin condensates of zinc-beta-naphthalene sulfonate, the zinc salt of condensation products of naphthalenesulfonic acid with formaldehyde. Naphthaleneformaldehyde sulfonic acid may be prepared by reacting a mixture of naphthalene, formaldehyde and sulfuric acid. Zinc naphthaleneformaldehyde sulfonate may be prepared by reacting zinc oxide with an aqueous solution of naphthaleneformaldehyde sulfonic acid to obtain the desired zinc naphthaleneformaldehyde sulfonate and filtering to remove unreacted zinc oxide. If desired, a zinc salt such as zinc carbonate may be used instead of zinc oxide.

Zinc naphthaleneformaldehyde sulfonate was chromatographed by size exclusion chromatography through a column containing pore sizes which can selectively separate molecular volumes according to size. The solvent chosen was one which minimizes solute-packing interaction and solute-solute interaction. This gives a true molecular volume profile when the eluents are displayed on a detector-strip chart recorder display. Comparison with the sodium naphthaleneformaldehyde sulfonate in U.S. Pat. No. 3,954,491—Adrian et al, issued May 4, 1976 was identical for the anionic materials. That is, the anionic materials have the same profile as the sodium naphthaleneformaldehyde sulfonates having lowest elution volumes of from about 61 to about 70% of the total elution volume and equivalent elution volumes of from about 61 to about 70% of the total elution volume. The teachings in the above mentioned patent relating to chromatography are incorporated by reference herein. This method was described by Dr. Harold Edelstein in a paper entitled, "Aqueous Gel Permeation Chromatograph of Some Naphthalene Sulfonic Acid Formaldehyde Condensates" which was presented at the Mini Symposium of the North Jersey Chromatograph Group Subsection of the A.C.S. on Mar. 6, 1978 at Hoffman La Roche Auditorium, Clifton, N.J.

The zinc naphthaleneformaldehyde sulfonate may be added to the concrete mix at any point in the process. It may be added to portland cement clinker prior to grinding and thoroughly mixed with the cement during grinding. The sulfonate may also be added to the ground cement powder as a dry powder, slurry or water solution and the ingredients can be thoroughly mixed to disperse uniformly. The zinc naphthaleneformaldehyde sulfonate may be dissolved in the water in which the cement, sand and gravel are mixed. The cement may be premixed with water and then the sulfonate added. In general, the zinc naphthaleneformaldehyde sulfonate may be added to the concrete mix at any stage prior to its final hardening.

The cements used in the preparation of the concrete mixes include Type I, II and III cements. The properties of the cements are well known and are described in the Portland Cement Association Engineering Bulletin entitled, "Design and Control of Concrete Mixtures", Eleventh Edition, July 1968, and "Kirk-Othmer Encyclopedia of Chemical Technology", Second Edition (Interscience Publishers, N.Y., N.Y. 1967), Volume 4, pages 690-692. The teaching as to the properties of these cements are disclosed in these publications and are incorporated by reference herein.

These cements may be used to prepare concrete mixes containing 100 parts by weight of cement, from about 140 to about 260 parts by weight of sand, from about 100 to about 200 parts by weight of gravel, from about 35 to about 60 parts by weight of water and an effective amount of zinc naphthaleneformaldehyde sulfonate sufficient to improve compressive strength of the hardened concrete with the preferred concrete mixes containing 100 parts by weight of cement, from about 160 to about 230 parts by weight of sand, from about 140 to about 180 parts by weight of gravel, from about 38 to about 50 parts by weight of water and an effective amount of zinc naphthaleneformaldehyde sufonate sufficient to improve compressive strength of the hardened concrete. The concentration of zinc naphthaleneformaldehyde sulfonate in the concrete mixes may vary from about 0.05 to about 3%, preferably from about 0.3 to about 1% (by weight of cement) to obtain hardened concrete having improved compressive strength. After preparation, these concrete mixes are then allowed to harden to obtain hardened concretes having improved compressive strengths.

For a fuller understanding of the nature and objects of this invention, reference may be made to the following examples. These examples are given merely to illustrate the invention and are not to be construed in a limiting sense. All quantities, proportions and percentages are by weight and all references to temperature are °C. unless otherwise indicated.

EXAMPLE I

This example describes preparation of zinc naphthaleneformaldehyde sulfonate.

A total of 300 g naphthaleneformaldehyde sulfonic acid was diluted with 100 ml water and the resulting solution heated to 85°-90° C. with agitation. Then 63 g zinc oxide (XX503 New Jersey Zinc Co.) was added gradually to the solution heated at 85°-90° C.

After the addition was completed and the pH of the reaction mixture reached 5.6, the mixture was heated with agitation for 30 minutes at 85°-90° C. and then allowed to cool. As the reaction product, a solution of zinc naphthaleneformaldehyde sulfonate, cooled to approximately 30° to 40° C., it was filtered to remove excess unreacted zinc oxide. The product was chromatographed by size exclusion chromatography and found to be equivalent to a commercial sample of Lomar ® D.

EXAMPLE II

This example describes the evaluation of 0.5% by weight of zinc naphthaleneformaldehyde sulfonate based on the weight of the cement in the concrete mix, 0.5% by weight of sodium naphthaleneformaldehyde sulfonate based on the weight of the cement in the concrete mix and a control concrete mix. The zinc naphthaleneformaldehyde sulfonate was prepared according to Example I and the sodium naphthaleneformaldehyde sulfonate was Lomar ® D, a commercially available product. Table I entitled, "Standard Mix Proportion Non-Air Entrained Concrete" shows the standard mix proportion used in the concrete mixes. This table is from the Portland Cement Association Engineering Bulletin entitled, "Design and Control of Concrete Mixtures", Eleventh Edition, July 1968. The standard mix proportion given in Table I was used as the control giving a reasonable workability for the tests. In the evaluation of the additives, water in the standard mix was reduced 20% to achieve a workable concrete mix. The cements used were Type I, II and III. Sand and ⅜" (10 mm) gravel meeting ASTM standard C33-74a were used. Except for a minor modification, the concrete batching procedure using a 2½ cu ft. (0.07 m³) tilting drum mixer followed ASTM standard C192-69. This variation, which results in better reproducibility in the properties of wet concrete, involves adding the zinc sulfonate or sodium sulfonate with the last volume of water rather than initially with the gravel.

Slump was measured according to ASTM standard C143-74. The air content in the fresh concrete was periodically checked by the pressure method (ASTM standard C231-75); however, for convenience, the Chaser air indicator was used more frequently. Specimens used for compressive strength testing were 3×6 in (75×150 mm) cylinders, consolidated by rodding and cured at 70°-75° F. and at 100% relative humidity. Data were collected at 1, 3, 7 and 28 days based on the average of values obtained from three cylinders following ASTM standard C39-72. Results of this evaluation are shown in Table II entitled, "Compressive Strength Tests at 20% Water Reduction." Table II gives comparative data on compressive strengths which demonstrate the superiority of the zinc naphthaleneformaldehyde sulfonate shown as "Zinc sulfonate" to the sodium naphthaleneformaldehyde sulfonate shown as "Sodium sulfonate." The "Control" in Table II was a concrete mix of each type of cement which did not contain additives. Marked improvements in compressive strengths were noted after 3 days and continually increased after 28 days. Improvements in compressive strengths were in the range of from about 133% to about 185% depending on the type of cement.

TABLE I

STANDARD MIX PROPORTION
NON-AIR ENTRAINED CONCRETE

Water/Cement Ratio = 0.5
Coarse Aggregate = ⅜ in (10 mm)
Fine Aggregate = Fineness Modulus 2.9

| Component | Weight lb | kg |
|---|---|---|
| Cement | 770 | 349.3 |
| Water | 385 | 174.6 |
| Sand | 1510 | 663.9 |
| Gravel | 1150 | 521.6 |

TABLE II

COMPRESSIVE STRENGTH TESTS
AT 20% WATER REDUCTION

| Additive* | Slump (in) | % Air Content | Compressive Strength (psi) After | | | |
|---|---|---|---|---|---|---|
| | | | 1 day | 3 day | 7 day | 28 day |
| TYPE I CEMENT | | | | | | |
| Zinc sulfonate | 3.0 | 1.0 | 2136 | 4567 | 5524 | 6309 |
| Sodium sulfonate | 4.0 | 1.0 | 2395 | 3614 | 4455 | 4928 |
| Control | 6.0 | 2.0 | 1462 | 3005 | 3625 | 4414 |
| TYPE II CEMENT | | | | | | |
| Zinc | 6.0 | 3.0 | 978 | 3761 | 5178 | 7548 |

TABLE II-continued

COMPRESSIVE STRENGTH TESTS AT 20% WATER REDUCTION

| sulfonate | | | | | | |
|---|---|---|---|---|---|---|
| Sodium sulfonate | 7.5 | 3.0 | 1467 | 3014 | 3759 | 6048 |
| Control | 8.5 | 3.0 | 783 | 1955 | 2717 | 4069 |

TYPE III CEMENT

| Zinc sulfonate | 7.0 | 2.0 | 3239 | 5321 | 5607 | 6964 |
|---|---|---|---|---|---|---|
| Sodium sulfonate | 8.5 | 2.0 | 3268 | 4536 | 5000 | 5679 |
| Control | 6.5 | 2.5 | 2776 | 3731 | 4285 | 5238 |

*0.5% by weight of additive based on weight of cement in the concrete mix

While the invention has been described with reference to certain specific embodiments thereof, it is understood that it is not to be so limited since alterations and changes may be made therein which are within the full and intended scope of the appended claims.

What is claimed is:

1. A hardened concrete characterized by enhanced compressive strength prepared from a concrete mix containing 100 parts by weight of cement, from about 140 to about 260 parts by weight of sand, from about 100 to about 200 parts by weight of gravel, from about 35 to about 60 parts by weight of water and an effective amount of zinc naphthaleneformaldehyde sulfonate sufficient to improve compressive strength of the hardened concrete.

2. The concrete of claim 1 wherein anionic materials in the zinc naphthaleneformaldehyde sulfonate have an equivalent elution volume by size exclusion chromatography of from about 61% to about 70% of the total elution.

3. The concrete of claim 1 wherein from about 0.05 to about 3% zinc naphthaleneformaldehyde sulfonate (by weight of cement) is present.

4. The concrete of claim 2 wherein from about 0.05 to about 3% zinc naphthaleneformaldehyde sulfonate (by weight of cement) is present.

5. The concrete of claim 1 wherein the cement is Type I.

6. The concrete of claim 1 wherein the cement is Type II.

7. The concrete of claim 1 wherein the cement is Type III.

8. The concrete of claim 2 wherein the cement is Type I.

9. The concrete of claim 2 wherein the cement is Type II.

10. The concrete of claim 2 wherein the cement is Type III.

11. A process for production of hardened concrete characterized by enhanced compressive strength comprising adding an effective amount of zinc naphthaleneformaldehyde sulfonate sufficient to enhance compressive strength of the hardened concrete to a concrete mix containing 100 parts by weight of cement, from about 140 to about 260 parts by weight of sand, from about 100 to about 200 parts by weight of gravel and from about 35 to about 60 parts by weight of water.

12. The process of claim 11 wherein anionic materials in the zinc naphthaleneformaldehyde sulfonate have an equivalent elution volume by size exclusion chromatography of from about 61% to about 70% of the total elution.

13. The process of claim 11 wherein from about 0.05 to about 3% zinc naphthaleneformaldehyde sulfonate (by weight of cement) is present.

14. The process of claim 12 wherein from about 0.05 to about 3% zinc naphthaleneformaldehyde sulfonate (by weight of cement) is present.

15. The process of claim 11 wherein the cement is Type I.

16. The process of claim 11 wherein the cement is Type II.

17. The process of claim 11 wherein the cement is Type III.

18. The process of claim 12 wherein the cement is Type I.

19. The process of claim 12 wherein the cement is Type II.

20. The concrete of claim 12 wherein the cement is Type III.

* * * * *